(12) United States Patent
Zimberg et al.

(10) Patent No.: US 8,499,300 B2
(45) Date of Patent: Jul. 30, 2013

(54) SYSTEM AND METHOD FOR TASK MANAGEMENT OF RULE BASED TASKS

(75) Inventors: Michael Zimberg, New York, NY (US); Martin Slack, Buckinghamshire (GB); Patrick J. Brennan, New York, NY (US); Joseph Jay Beyda, Marlboro, NJ (US); Andrei Tokar, Fairlawn, NJ (US); Peter Haines, Suffolk (GB)

(73) Assignee: Bank of America Corporation, Charlotte, NC (US)

( * ) Notice: Subject to any disclaimer, the term of this patent is extended or adjusted under 35 U.S.C. 154(b) by 1669 days.

(21) Appl. No.: 11/283,981

(22) Filed: Nov. 21, 2005
(Under 37 CFR 1.47)

(65) Prior Publication Data

US 2006/0136922 A1   Jun. 22, 2006

Related U.S. Application Data

(60) Provisional application No. 60/651,500, filed on Dec. 20, 2004.

(51) Int. Cl.
*G06F 9/46* (2006.01)
*G06Q 10/00* (2012.01)

(52) U.S. Cl.
USPC .................... 718/103; 705/7.12; 705/7.28

(58) Field of Classification Search
USPC ................... 718/103, 106; 705/7–9
See application file for complete search history.

(56) References Cited

U.S. PATENT DOCUMENTS

| | | | |
|---|---|---|---|
| 5,960,404 A * | 9/1999 | Chaar et al. | 705/8 |
| 6,578,006 B1 * | 6/2003 | Saito et al. | 705/9 |
| 6,895,573 B2 * | 5/2005 | Nørgaard et al. | 717/100 |
| 6,937,993 B1 * | 8/2005 | Gabbita et al. | 705/8 |
| 6,938,048 B1 * | 8/2005 | Jilk et al. | 707/102 |
| 6,954,737 B2 * | 10/2005 | Kalantar et al. | 705/50 |
| 7,028,303 B2 * | 4/2006 | Lahey et al. | 718/106 |
| 7,136,827 B2 * | 11/2006 | Eicher | 705/7.28 |
| 7,155,400 B1 * | 12/2006 | Jilk et al. | 705/9 |
| 7,184,967 B1 * | 2/2007 | Mital et al. | 705/8 |
| 7,275,039 B2 * | 9/2007 | Setteducati | 705/8 |
| 7,299,244 B2 * | 11/2007 | Hertling et al. | 707/104.1 |
| 7,337,950 B2 * | 3/2008 | DeVault | 235/376 |
| 2002/0007300 A1 * | 1/2002 | Slatter | 705/9 |
| 2002/0016729 A1 * | 2/2002 | Breitenbach et al. | 705/9 |

(Continued)

OTHER PUBLICATIONS

Patterson et al., "A Risk Register Database System to Aid the Management of Project Risk", International Journal of Project Management 20, 2002, pp. 365-374.*

(Continued)

*Primary Examiner* — Jennifer To
(74) *Attorney, Agent, or Firm* — Michael A. Springs; Moore and Van Allen, PLLC; Patrick B. Horne

(57) ABSTRACT

System and methods for task management of rule based tasks. The task management system of the invention includes various modules that work together to accomplish task monitoring, scheduling, prioritization, compliance and reporting. A task management module facilitates the development of task compliance by scheduling and prioritizing tasks based on the needs of the enterprise. The tasks are provided in task modules that set out specific steps for completing the tasks. A common database is operatively connected to the task management module, task module and other modules to maintain the rules and policies, the tasks to be completed and the responses to those tasks.

22 Claims, 13 Drawing Sheets

U.S. PATENT DOCUMENTS

| | | | |
|---|---|---|---|
| 2002/0065701 A1* | 5/2002 | Kim et al. | 705/9 |
| 2002/0077842 A1* | 6/2002 | Charisius et al. | 705/1 |
| 2003/0018508 A1* | 1/2003 | Schwanke | 705/9 |
| 2003/0023543 A1* | 1/2003 | Gunewardena et al. | 705/38 |
| 2003/0084016 A1* | 5/2003 | Norgaard et al. | 706/60 |
| 2003/0131040 A1 | 7/2003 | Braun et al. | |
| 2003/0149714 A1* | 8/2003 | Casati et al. | 709/100 |
| 2003/0204429 A1 | 10/2003 | Botscheck et al. | |
| 2004/0002885 A1* | 1/2004 | Levy | 705/8 |
| 2004/0111430 A1* | 6/2004 | Hertling et al. | 707/104.1 |
| 2004/0267660 A1* | 12/2004 | Greenwood et al. | 705/38 |
| 2005/0027651 A1* | 2/2005 | DeVault | 705/38 |
| 2005/0028158 A1* | 2/2005 | Ferguson et al. | 718/100 |
| 2005/0125324 A1* | 6/2005 | Eicher | 705/35 |
| 2006/0085245 A1* | 4/2006 | Takatsuka et al. | 705/9 |
| 2006/0293946 A1* | 12/2006 | Eicher | 705/10 |

OTHER PUBLICATIONS

PCT International Preliminary Report on Patentability dated Jul. 5, 2007.

PCT International Search Report for PCT/US05/45952 which is the corresponding PCT application for this U.S. patent application, dated Oct. 31, 2006.

PCT Written Search Report for PCT/US05/45952 which is the corresponding PCT application for this U.S. patent application, dated Oct. 31, 2006.

* cited by examiner

FIG. 4

NEW RULE / POLICY CREATION

Identification of the Client ⌐401

Rule Source: [FSA ▾]⌐402

Rule Number: [3.1.3]⌐403

Name: [Identification of the Client]⌐404

Description: [Part of the suite of questions for the account opening review]⌐405

Content: [the internal guidelines of the enterprise meet the requirements of the Financial Services Authority (FSA)

It is essential that these procedures are followed

To ensure the procedures are operated correctly the monitoring group tests the procedure on a semi-annual basis]⌐406

Attachments: Title [ ]⌐407
File [ ] [Browse...] [⊕ ADD]

TASK CREATION

☐ DELETE

Task Name: [Account Opening Review] ─ 501

Objective: detailed procedure in place to insure that all new accounts opened are done so in accordance with the rules.

It is essential that these procedures are followed. ─ 502

Test Instructions: FIRST STEPS

1. Examine a sample of client files.

2. Examine all client files from Non Co-operative jurisdictions, which have been opened during the last quarter. Then follow the steps listed in 5 to 7 inclusive. ─ 503

☒ PREVIEW  Identification of the Client
           Government and FATF Findings

Associated Rules: ⊕ Add
                    Rule
                 ⊗ FSA   3.1.3
                 ⊗ FSA   5.1.2   ⎤
                 ⊗ FSA   3.1.9   ⎬ 504
                 ⊗ FSA   3.1.8   ⎦

TASK CREATION CONTINUED

Questionnaire: Account Opening Review ▷ — 505  ☐ PREVIEW  ☐ NEW
Interval: Semi-annually ▷ — 506
Start Date: — 507
End Date: — 508
Role: ▷ — 509
LOB/Product: ▷  ☐ NEW — 510
Region/Country: ▷  ☐ NEW — 511
Attachments: Title [       ] — 512
File [       ] Browse...  ⊕ ADD

☐ SAVE   ⊗ CANCEL

FIG. 5B

TASK QUESTIONNARE

Name: 23A&B Federal Reserve Board — 601

Description: Affiliate Transactions — 602

Form Controls:

| | Question | | Type |
|---|---|---|---|
| ⊗ | 1. Bond Name | | vertical |
| | ⊗ 1. Issuer | | text |
| | ⊗ 2. Trade Date | | text |
| | ⊗ 3. Price | | number |
| | ⊗ 4. Tenor | | date |
| | ⊗ 5. Mid Price | | number |
| | ⊗ 6. Close to mid price | | yesno |
| ⊗ | 2. Are all bonds within the accepted range? | | yesno |
| ⊗ | 3. In cases where prices are outside the range has the Fixed Income UCO been informed? | | checkbox |

⊕Add Question   ⊕Add Group

603 — 605

⊡PREVIEW   ☐SAVE   ⊗CANCEL

Associated Tasks:

| Task Name | Role | LOB/Product | Region/Country |
|---|---|---|---|
| 23A&B Federal Reserve Board–Bonds | Head of Risk Assessment | | |

| Search | | | | |
|---|---|---|---|---|
| Rules ▽ | ▽ | | ⊙ GO | |

Today's Tasks

| Date | Task Name | Status | Role | Region/Country | LOB/Product |
|---|---|---|---|---|---|
| 2004-07-07 | TASK A | active | Role 1 | XXX | — |
| 2004-07-07 | TASK B | active | Role 1 | XXX | — |
| 2004-07-07 | TASK C | active | Role 2 | XXX | — |
| 2004-07-07 | TASK N | active | Role N | XXX | — |

1101

SYSTEM AND METHOD FOR TASK MANAGEMENT OF RULE BASED TASKS

CROSS REFERENCE TO RELATED APPLICATION

This application is a non-provisional of provisional patent application Ser. No. 60/651,500, filed Dec. 20, 2004, entitled "System and Method for Task Management of Rule Governed Tasks", which was originally filed as patent application Ser. No. 10/905,164, filed Dec. 20, 2004, entitled "System and Method for Task Management of Rule Governed Tasks", and was converted into a provisional application after filing. Patent application Ser. No. 60/651,500 is incorporated herein in its entirety by reference.

BACKGROUND OF THE INVENTION

Many institutions must comply with various rules, policies, regulations, and guidelines, whether established internally, by a regulatory entity, or as a result of legislation (hereinafter "rules"). Because some of these rules may place responsibility on the institution for overseeing consistent compliance or adherence to the rules, there is an increasing need for a comprehensive process to manage rule compliance and task management across an entire business organization. For very large and geographically diverse organizations, these requirements can create a significant challenge and resource expenditure.

Prior efforts to manage rule based tasks required separate systems without readily available task oversight and management or reporting of task compliance across an enterprise. Moreover, the entity or individual charged with ensuring task compliance must manage a number of disparate systems where the day-to-day workflow cannot be conveniently and efficiently prioritized, monitored and scheduled. The use of separate systems also makes it difficult to ensure that tasks are handled in a consistent and uniform manner across the enterprise. Additionally, effective task management can at times uncover areas where improvements or remedial actions must be implemented. Generally, these efforts can lack currency and are sometimes not adequately monitored and tracked over time. Therefore, there is a need for an integrated process and system for efficiently managing and monitoring rule governed task compliance.

SUMMARY OF THE INVENTION

This invention provides task management processes and tools for any task that is governed by rules where completion of the task is best accomplished by uniform, systematic treatment of the task. In some embodiments, the invention is described with respect to organizations where the rules are implemented across a large enterprise by multiple business units or divisions but compliance is monitored through a central governance and reporting process. However, the principles of the invention can be applied in enterprises of any size. The invention can be adapted to any type of task monitoring and compliance function, including legal or regulatory requirements, compliance with internal policies, or the policies of non-governmental organizations such as trade associations or accrediting agencies. An example of one such function is risk management.

In some embodiments the task management system of the invention includes various modules, applications, or "application modules" that work together to accomplish task monitoring, scheduling, prioritization, compliance and reporting. These can be implemented by a computer system or systems, software, and networks, or by other similar means. In some embodiments a task management module facilitates the development of task compliance by scheduling and prioritizing tasks based on the needs of the enterprise. The tasks are provided in task modules that set out specific steps for completing the tasks. The task management module controls the tasks based on the rules and policies governing the entity by providing the task modules having tasks and task related material to the individuals that are ultimately responsible for completing the tasks. A common database is operatively connected to the task management module, task module and other modules to maintain the rules and policies, the tasks to be completed and the responses to those tasks. A reporting function can be provided to monitor the tasks of an enterprise over time.

The task management process implemented by a task management module preferably includes identifying the tasks to be performed for a relevant time period. Included with the task modules are scripts including questionnaires, tests and the like that must be completed or satisfied, instructions as to the data that must be collected, as well as general guidelines and background information. When a task is initiated a relevant task module is launched to provide a script to follow when completing the task. Information collected during completion of the task is saved in a predetermined format such that it can be retrieved by the organization to perform follow-up analysis such as compliance assessments, worker efficiency evaluations and the like. The use of task management modules allows the system manager to prioritize and schedule the tasks of the enterprise, perform follow-up analysis and ensure the uniform handling of like tasks.

In some embodiments, the invention is implemented via a computing platform or a collection of computing platforms interconnected by a network, such as a corporate intranet, in which case a web browser can facilitate use of the invention. A computer program product or products containing computer programs with various instructions cause the hardware to carry out, at least in part, the methods of the invention. Applications, or modules, such as the previously mentioned task management module and task module, are operated on a server or workstation. If the applications are running on a server, the modules are accessed from a client workstation. A database is operatively connected to the modules. The database can reside on the same platform as one or more of the application modules, but more typically will reside on a database server. In this computer-based embodiment, the hardware and software together form the means for carrying out the invention.

BRIEF DESCRIPTION OF THE DRAWINGS

FIG. 4 is an example screen shot that might be created by the task activity module of the invention.

FIGS. 5A and 5B are an example screen shot that might be created by the task module of the invention.

FIG. 6 is an example screen shot that might be created by the task module of the invention.

FIG. 11 is an example screen shot that might be encountered in a computer implemented embodiment of the invention.

DETAILED DESCRIPTION OF EXAMPLE EMBODIMENTS

The present invention can most readily be understood by considering the detailed embodiments presented herein. Some of these embodiments are presented in the context of a large enterprise using a corporate intranet to facilitate the carrying out of the task management function; however, these embodiments are examples only. The invention has applicability to any type of task management activity in any type of organization.

The terms "enterprise" or "organization" typically are being used to refer to an entity such as a company or association that is making use of the invention. The entity can be large or small. A "business unit" generally refers to a division within an enterprise or organization. The "system administrator" is the person, persons or entity that is authorized to approve and direct the activities related to the task management system on behalf of an enterprise, either for the enterprise as a whole, or for a business unit.

A "role" is used in this application to represent a function defined by the institution that is required to complete one or more tasks such as a compliance officer, auditor or other function. Typically a role will be filled by an individual or team of individuals authorized and trained to perform the function required by the specific task.

The terms, "module", "application module", and in some cases, simply "application" are meant to refer to a specific process that is performed as part of the task management system discussed throughout. Often a module corresponds to a software application. Some modules are for processes in which a role provides a response for each of a series of questions or otherwise collects and inputs data to the system. The term "response" is used to refer to information that is provided to the system in response to a task.

Figure 1:
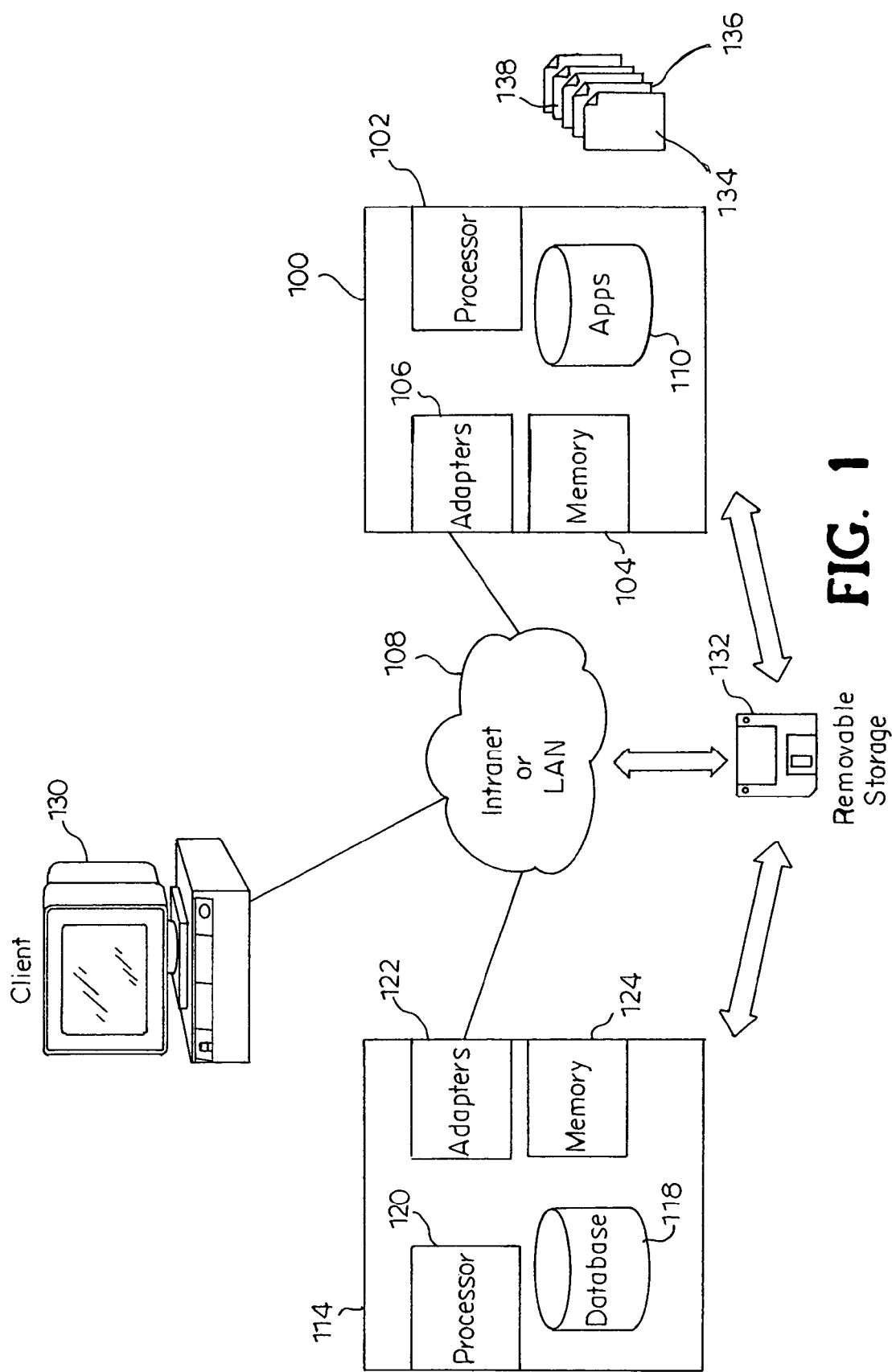
FIG. 1 is a block diagram of some of the computing hardware that is used to implement some embodiments of the invention
Figure 2:
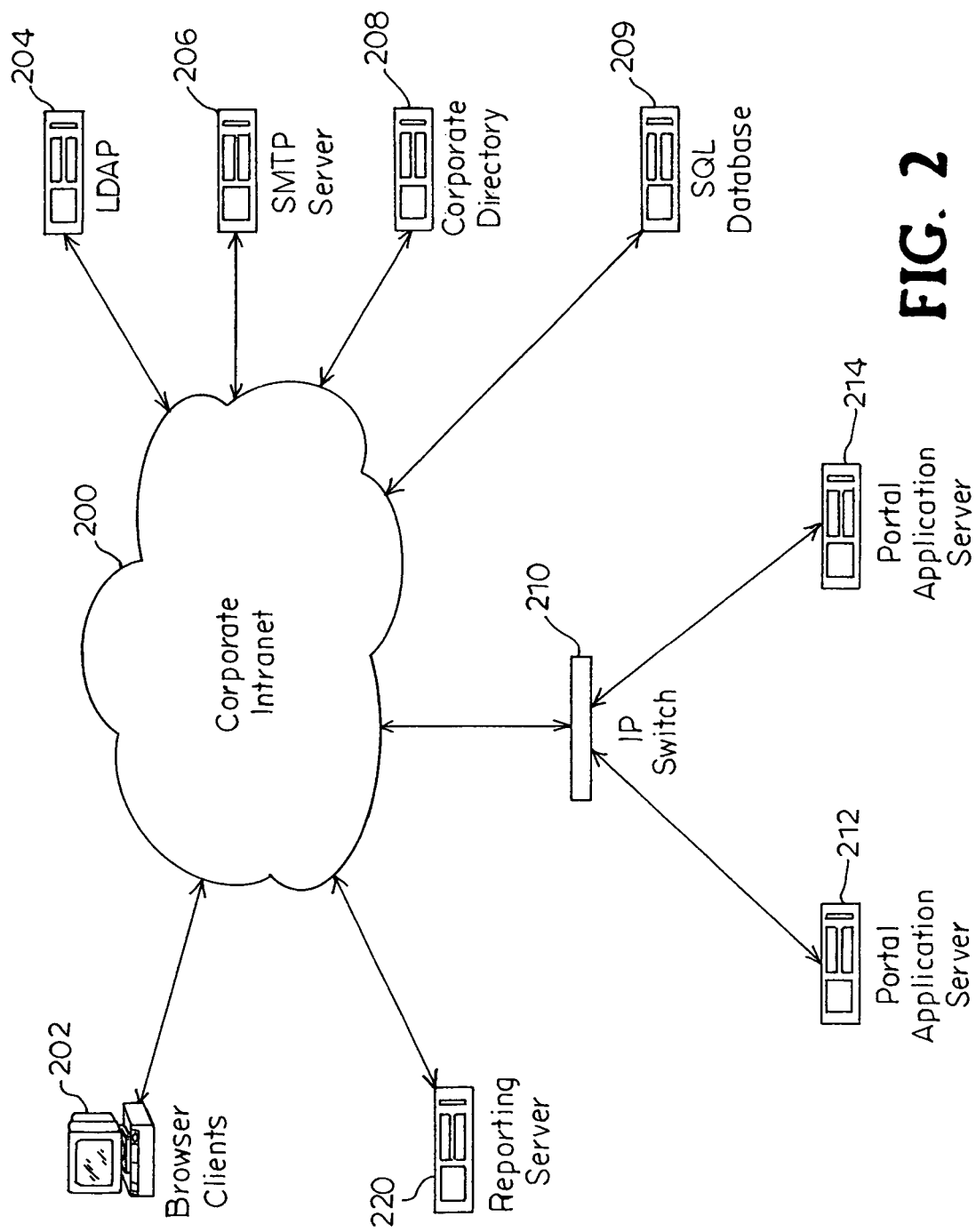
FIG. 2 is a network block diagram of the hardware used to implement the invention in an example embodiment suitable for use in a large enterprise.

FIG. 1 illustrates, in block diagram form, a view of a computer-implemented embodiment of the invention as it might be implemented on a network. A view of the components of a networked, on-line system is shown in FIG. 2, discussed below. FIG. 1 includes a computing platform, 100. The platform is controlled by a processor, 102, which serves as the central processing unit (CPU) for the platform. Memory 104 is typically divided into multiple types of memory or memory areas such as read-only memory (ROM), and random access memory (RAM). A plurality of general-purpose adapters, 106, are present. At least one, in this example, serves to connect the computing platform to a network 108. The network might be a corporate intranet, or simply a local area network (LAN). Computer program code instructions for implementing the appropriate application modules (Apps) are stored on the fixed disk, 110 including task management modules 134, task modules 136 and task activity modules 138. When the system is operating, the instructions are partially loaded into memory and executed by the CPU. Numerous types of general purpose computer systems and workstations are available and can be used to implement computing platform 100. Available systems include those that run operating systems such as Windows™ by Microsoft, various versions of UNIX(, various versions of Linux(, and various versions of Apple's Mac( OS.

It must be noted that the entire function of the invention, including the common database can be implemented in whole or in part on a single computing platform like that shown in FIG. 1. This might be the case, for example, if a small business were to make use of the invention on a stand-alone personal computer. The invention can also be implemented partly using paper-based means, in which case forms would replace various computer entry steps and screens disclosed herein. In other embodiments, however, the common database would be stored on a database server such as an SQL server, as shown at 114 of FIG. 1. In this case, fixed disk storage, 118, contains the database. Processor 120, adapters 122, and memory 124 function similarly to those of computing platform 100. If a corporate intranet is used for connectivity, the applications or modules on computing platform 100 can be accessed from a client workstation 130, via a web page. With appropriate security protocols, the assessments and action tracking can also be accomplished remotely over the Internet as will hereinafter be explained with reference to FIG. 2.

In any case, a computer program which implements parts of the invention through the use of a system like that illustrated in FIG. 1 can take the form of a computer program product residing on a computer usable or computer readable storage medium. Such a medium, a diskette, is shown at 132 in FIG. 1. A computer program product containing the program of instructions can be supplied in such a form, and loaded on the machines involved, either directly, or over a network. The computer programs can reside on any medium that can contain, store, communicate, or transport the program for use by or in connection with an instruction execution system, apparatus, or device. The computer-usable or computer-readable medium may be, for example but not limited to, any tangible electronic, magnetic, optical, electromagnetic, infrared, or semiconductor system, apparatus, or device. Other examples of the computer-readable medium would include an electrical connection having one or more wires, a portable computer diskette or portable fixed disk, an optical fiber, a compact disc read-only memory (CD-ROM), and a digital versatile disc read-only memory (DVD-ROM).

Figure 3:
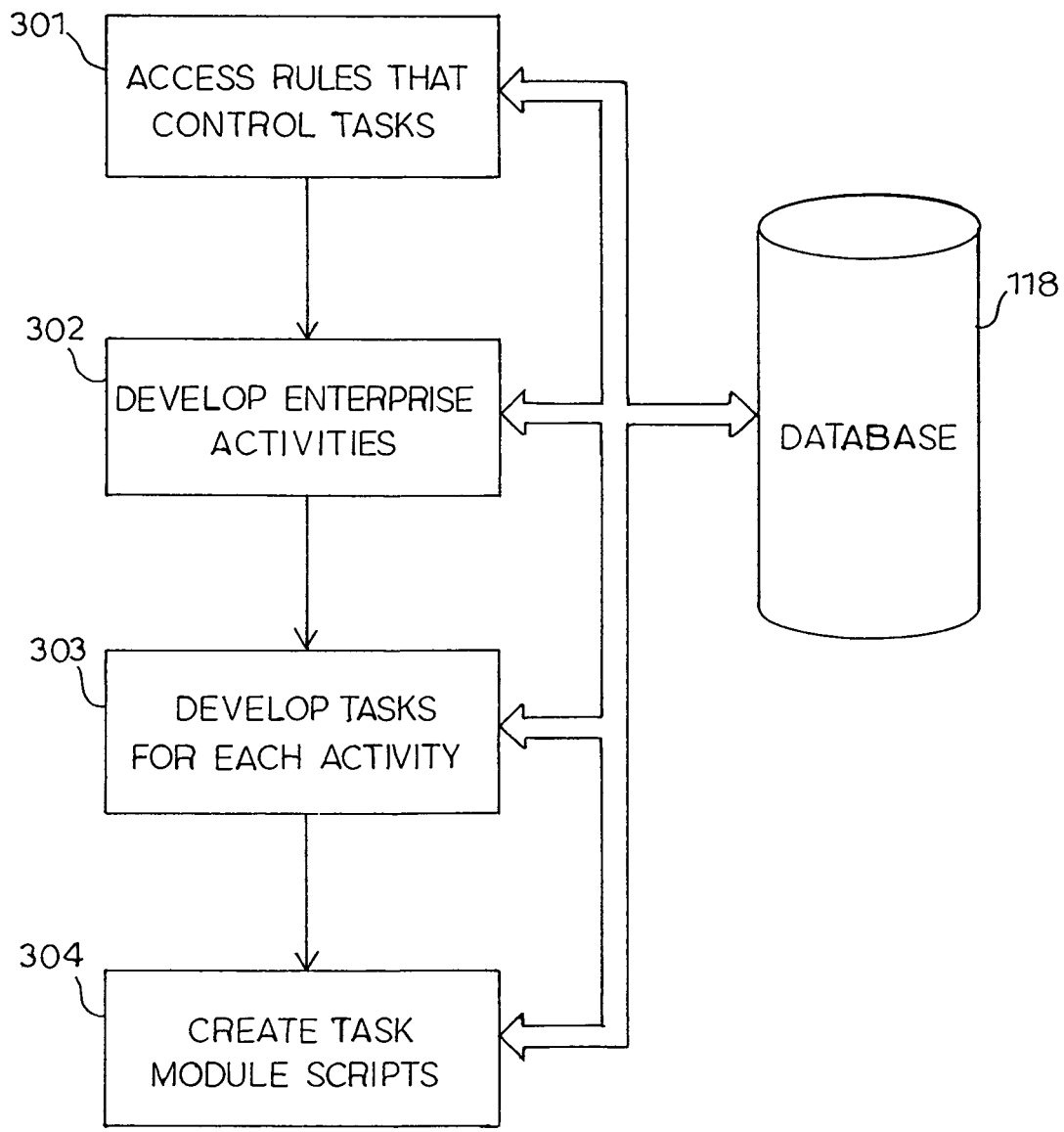
FIG. 3 is a flowchart illustrating the initiation and set up of the task management system according to one embodiment of the invention.

Initiation and set up of the system of the invention will now be described with reference to FIG. 1 and the flow diagram of FIG. 3. The system administrator accesses the rules that apply to the enterprise and for which the system administrator is ultimately responsible 301. These rules can be stored on the system in memory 104 or 124 or may be accessed from an archive separate from the system. In a preferred embodiment the rules are accessible by the roles when the roles are performing the tasks such as at work station 130. The term "work station" as used in this application is intended to encompass any device from which a role accesses the system of the invention. Based on the rules and the requirements of the organization, task activity modules 138 are developed for the organization 302. The task activity module 138 typically would consist of a high level description of the purpose, background and process needed to be undertaken by the organization as determined by application of the rules. The background information could include a description of the activity to which the tasks relate or other relevant information. An example of a screen shot showing the output of a task activity module 138 is shown in FIG. 4. In the illustrated example, the activity is identified at 401. Background information associated with the activity is exemplary provided as the Rule Source field 402 (providing the relevant rule such as a United States Code chapter or internal policy number); Rule Number field 403 (providing the relevant rule section), Name of Activity field 404 (providing the common name for the enterprise activity). In one embodiment these fields include links that allow the role to access the information in the field that is stored in the system data base. The information further includes a field for entering an activity Description field 405 and Content field 406. These fields could include, for example, a statement describing the overall process to which this activity relates and organizational policy or instructions. Attachments 407 are included that provide associated documents to the role or where a role can paste documents to be sent to the system with the response. While specific information has been described it will be appreciated that other fields could be provided and that different information could be stored based on the needs of the organization.

Referring again to FIG. 3, based on the activity and the details developed in block 302 a series of specific tasks are created that are to be completed to comply with rules governing the organization 303. The tasks consist of specific questionnaires or other data collecting activities that are used by the roles to gather relevant information and complete the task. For each task, or a subset of a task, a task module that includes a task template or script is created 304 that lead a role through a task by setting out the questionnaires or other data gathering activities, the actions to be taken in response to particular data/responses and other task steps. The scripts are stored in task modules 134 in memory 104 or 124 and are accessed by the roles at the client work stations 130.

An example of a screen shot showing a sample output from task module is illustrated in FIGS. 5A and 5B. The task module includes a Task Name field 501 and an Objective field 502 that are primarily used to orient the role as to the purpose of the task being performed. The Test Instruction field 503 provides step-by-step instructions to the role as to how the task is to be completed. Also included are links to the Rules 504 related to the specific task to which the role can refer. Questionnaire field 505 is provided that is to be completed by the role as part of the steps identified in Test Instruction field 503.

Opening Questionnaire field 505 would launch the questionnaire screen shot 600, an example of which is shown in FIG. 6. The questionnaire script includes a Name field 601 for identifying the specific subject matter of the questionnaire and a Description field 602 that provides a high level description of the script. In the illustrated screen shot a number of questions 603 are presented that need to be completed by the role to complete the task. Preferably the questions are broken down in such a manner that the responses input 605 by the role conform to a predetermined format such that later review of the responses is facilitated; however, unformatted responses could be provided if desired. Once the questionnaire 600 is completed it can be saved to the system data base.

Referring again to FIG. 5, the task module 134 can also include additional fields such as:
an Interval field 506 setting out how often the task needs to be performed;
a task Start Date field 507 and task End Date field 508 that can be used to provide deadlines to the role;
a Status field 509 setting out the function or organizational position of the role;
a Business Unit or Product field 510 setting out the business to which the activity relates; and
a Region/Country field 511 setting out the area to which the activity relates.
Further, Attachments 512 such as can be included.

Figure 7:
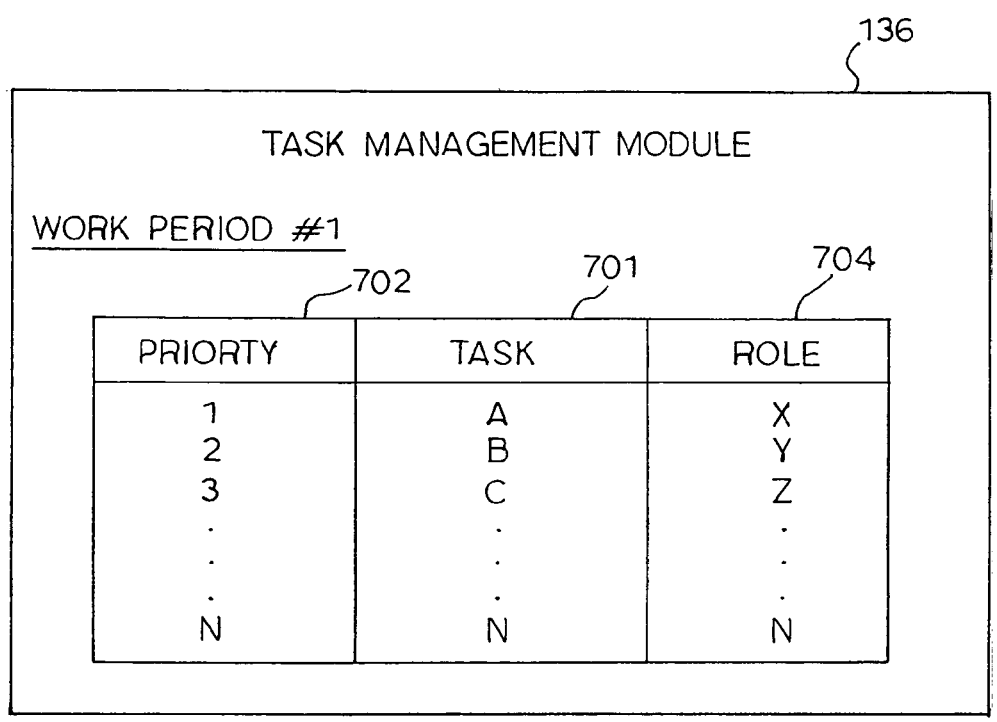
FIG. 7 shows one embodiment of the task management module of the invention.
Figure 8:
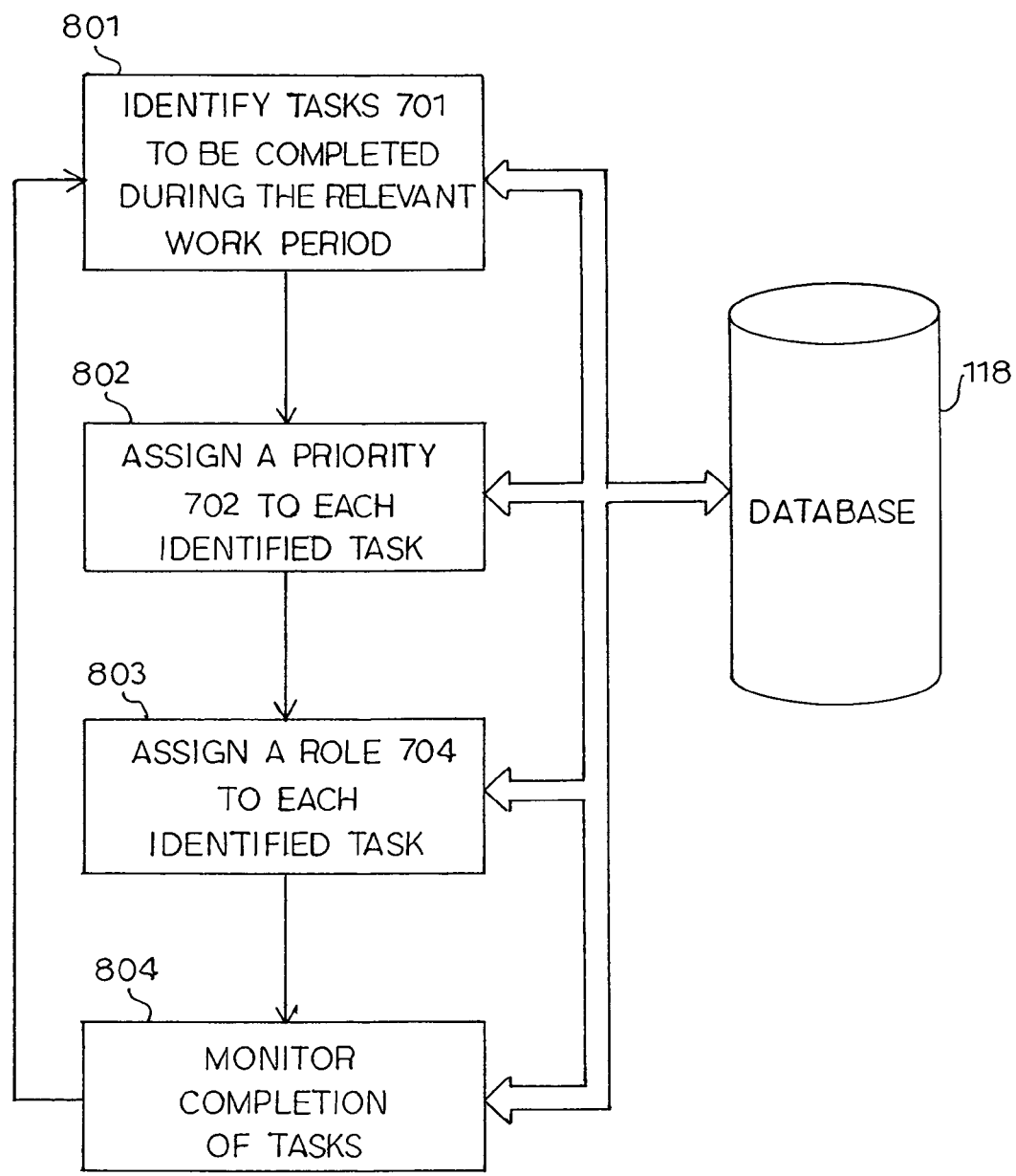
FIG. 8 is a flowchart illustrating the set up of the task management module according to one embodiment of the invention.

In addition to the task module used by the role on a particular activity, the system includes task management modules 136 that are created and used by the task management module to control the work flow of the roles. The task management module 136 is shown in greater detail in FIG. 7 and may include a prioritization of the tasks to be completed. Tasks created in the task module 134 are managed by the task management module 136 to control the work flow of the organization. FIG. 8 is a flow diagram showing the creation of the task management module. Specifically, in block 801 tasks 701 that are to be completed for the relevant work period are identified. In block 802 each task 701 may be assigned a priority 702 to create a prioritized ordering of the tasks indicating the order in which the tasks are to be completed. The prioritization can be based on a docket system of tasks that need to be performed and associated due dates for completion. Priorities are given based on the needs of the organization but can include factors such as regulatory timelines, organizational policies, activity importance, risk of non-compliance and the like. In one embodiment priorities can be assigned using a weighted average risk factor. For example, for a given set of tasks each task can be rated from 1-10 based on a number of risk factors. The risk factors being those factors determined by the system administrator to be most critical for completion of the tasks. Each factor is then assigned a rating from 1-110 and the average rating is determined. Tasks with a higher risk factor are given a higher priority. The risk factors could also be weighted such that a particular factor could account for more or less of the average. A simplified assignment of risk could also be used where a given task is simply assigned a rating of 1-10 depending on its identified risk. Moreover, the weighted average and simplified system could be used together where tasks are prioritized together regardless of now how the priority was determined. For example, on task with a simple rating of 3 could be prioritized between tasks having weighted averages of 2 and 4. Priorities are modifiable such that new priorities can be added, priorities changed or existing priorities deleted based on the changing needs of the organization. In block 803 the tasks are assigned to roles 704 such that the system administrator can control the order of the completion of the tasks, the deadlines and the roles that will complete the tasks. When a task is initiated by the role to which it was assigned, the corresponding script is accessed from the client workstation 130 and completed by the role. Since the tasks are completed according the scripts in task module 134 each like task will be completed in a uniform and consistent manner. In block 804, when a task is completed by a role, the completion of the task is monitored and the identification of tasks that need to be completed is updated as will hereinafter be explained in further detail.

Figure 9:
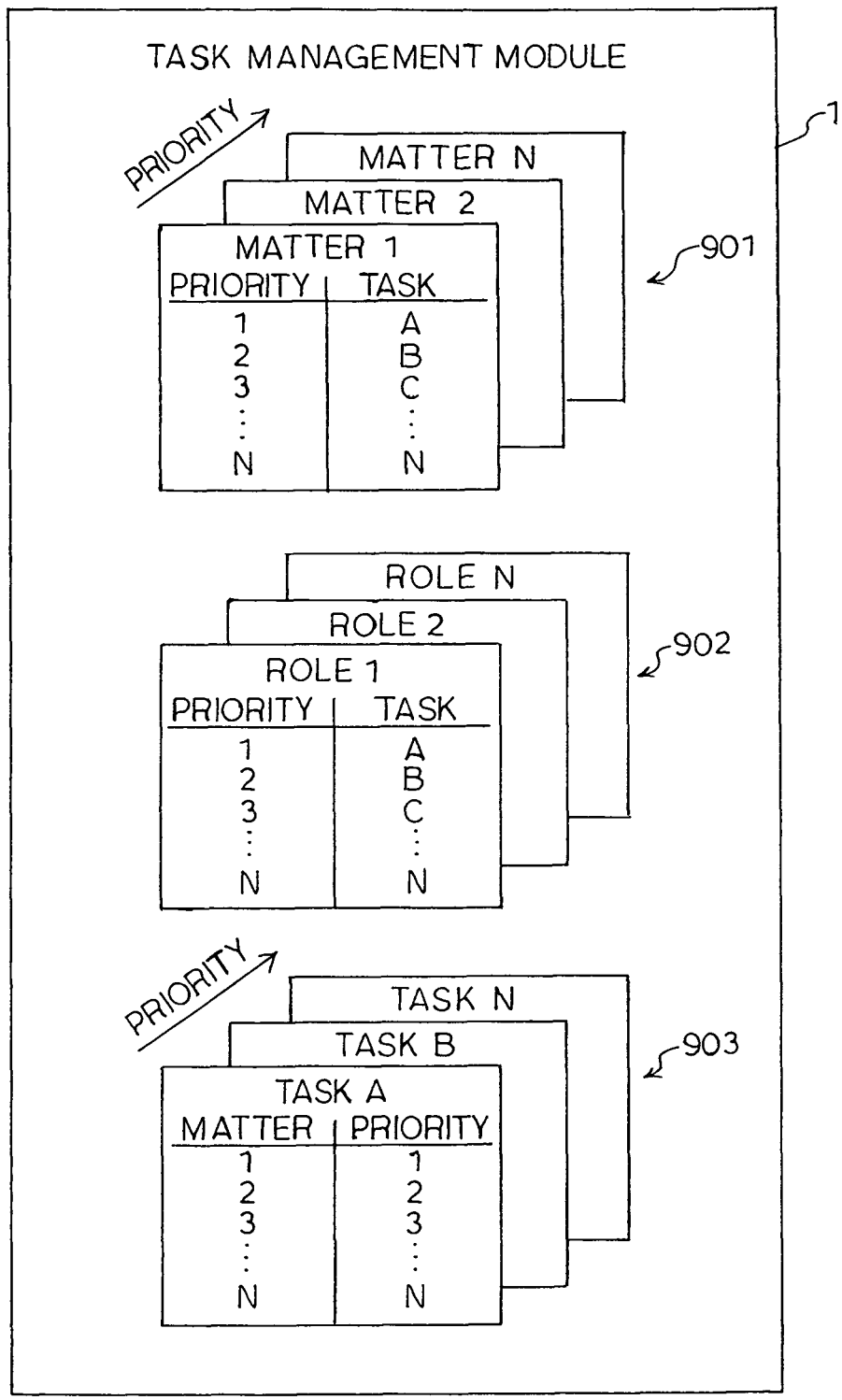
FIG. 9 shows a second embodiment of the task management module of the invention.

A more complex version of the task management module 136 will be described with reference to FIG. 9. In this embodiment, the tasks can be grouped by commonalities such as a relation to a specific matter, common roles, common tasks or the like. For example as shown at Group 901 the tasks are grouped by matter. Thus all tasks associated with a specific matter are grouped such as by providing each task with a common logical identifier. The system administrator can then assign priorities based on matters such that, for example, all tasks associated with Matter 1 are given a priority higher than all tasks associated with matter 2 and so on. The Tasks A . . .

n within Matter 1 can then be further prioritized. Likewise other groupings can be made such as by Role as shown at Group 902 where the workload for a particular role is prioritized separately from the work loads of other roles. Likewise like tasks can be grouped together as shown at Group 903 where similar tasks are prioritized such that Task A has a higher priority than Task B and so on. The groupings can be used independently of one another or used in a hierarchical system such that, for example, matters are prioritized and tasks within the matters are also prioritized as shown at 901 or tasks are prioritized and matters within tasks are also prioritized. This allows the system administrator to not only identify the tasks to be performed and the roles to perform the tasks but also the order in which the tasks are completed. Thus for each activity in the system the system maintains an identification of the tasks needed to be completed and the priority in which the tasks are to be completed.

The system is modular in that for any activity for which the system administrator has responsibility the activity can be broken down into one or more tasks each of which can be grouped and prioritized. By assigning the appropriate priority the system administrator can control not only the activity to be worked but also can control the order of the specific tasks needed to complete the activity. Because the system is modular and dynamic it can be continuously updated to control the task list.

Input of the activities, priorities and tasks into the system allows the system administrator to allocate activities and tasks to particular work stations/roles. It is to be noted that tasks could be assigned to a work station such that any individual logging in at that work station handles the assigned tasks or tasks could be assigned to a specific role such that the log-in identification is used to identify the role working at a particular work station. Prior to the beginning of each work period, the system administrator assigns activities to particular roles or work stations. For example, for a one day work period, prior to beginning of the day the system administrator identifies the tasks to be performed during that day. The work period can be any period of time. The selection of the tasks can be automated such that the system stores the number and types of tasks to be completed during the work period based on previous averages for completing similar activities. It is also contemplated that the system administrator could prioritize work irrespective of a set real time work period and simply prioritize the tasks for an indeterminate period of time.

Once the activities/tasks for the work period are identified, the tasks are prioritized and, if desired, grouped according to a group commonality or combination or hierarchy of commonalities. The tasks are then assigned to the appropriate work station/role by priority with the next activity on the priority list given to, for example, the first available work station/role. Alternatively all activities of the same type could be given to a subset of work stations/role specializing in those activities. Or all activities related to the same matter could be given to the same work station/role such that a single work station/role works on all related activities for a common activity. The activities could be broken down based on other criteria or using multiple criteria. The tasks assigned, the work station/role to which a task is assigned, and the due date for completing the task are stored by the system.

Figure 10:
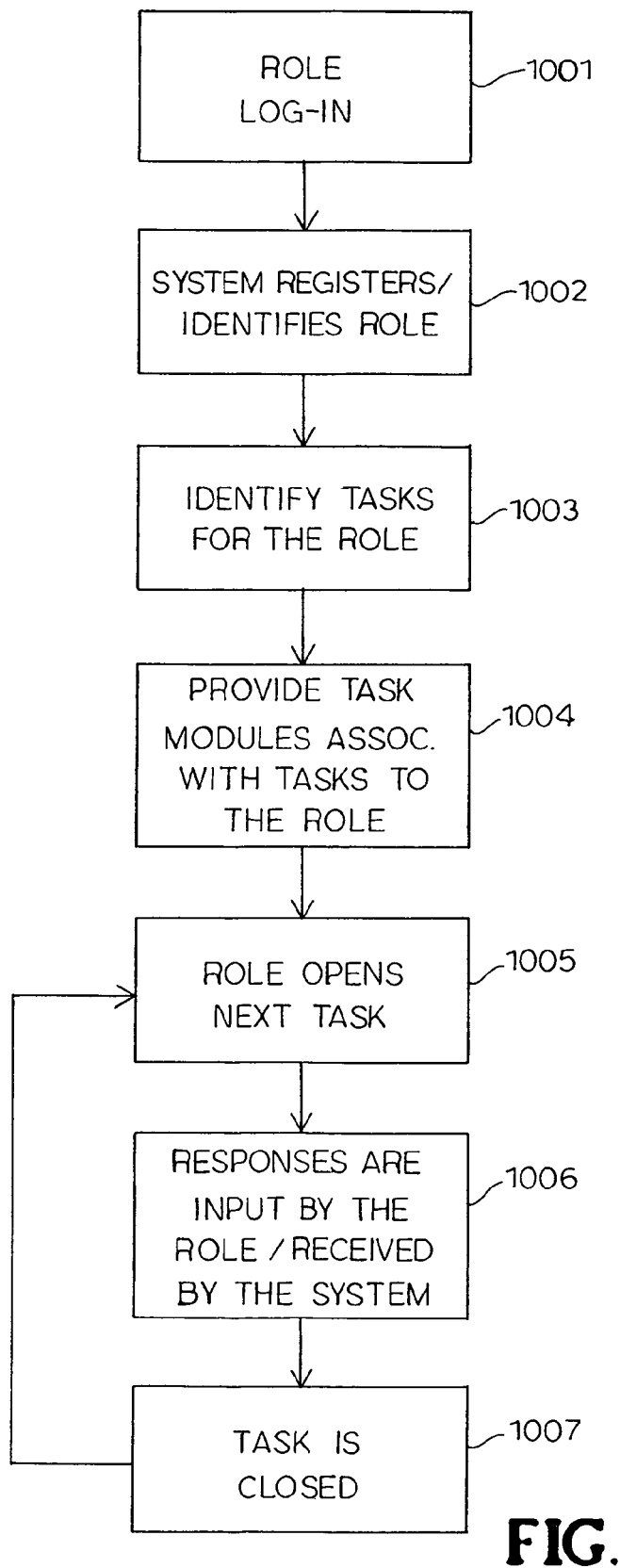
FIG. 10 is a flowchart illustrating the use of the system of the invention to complete a task.
Figure 12:
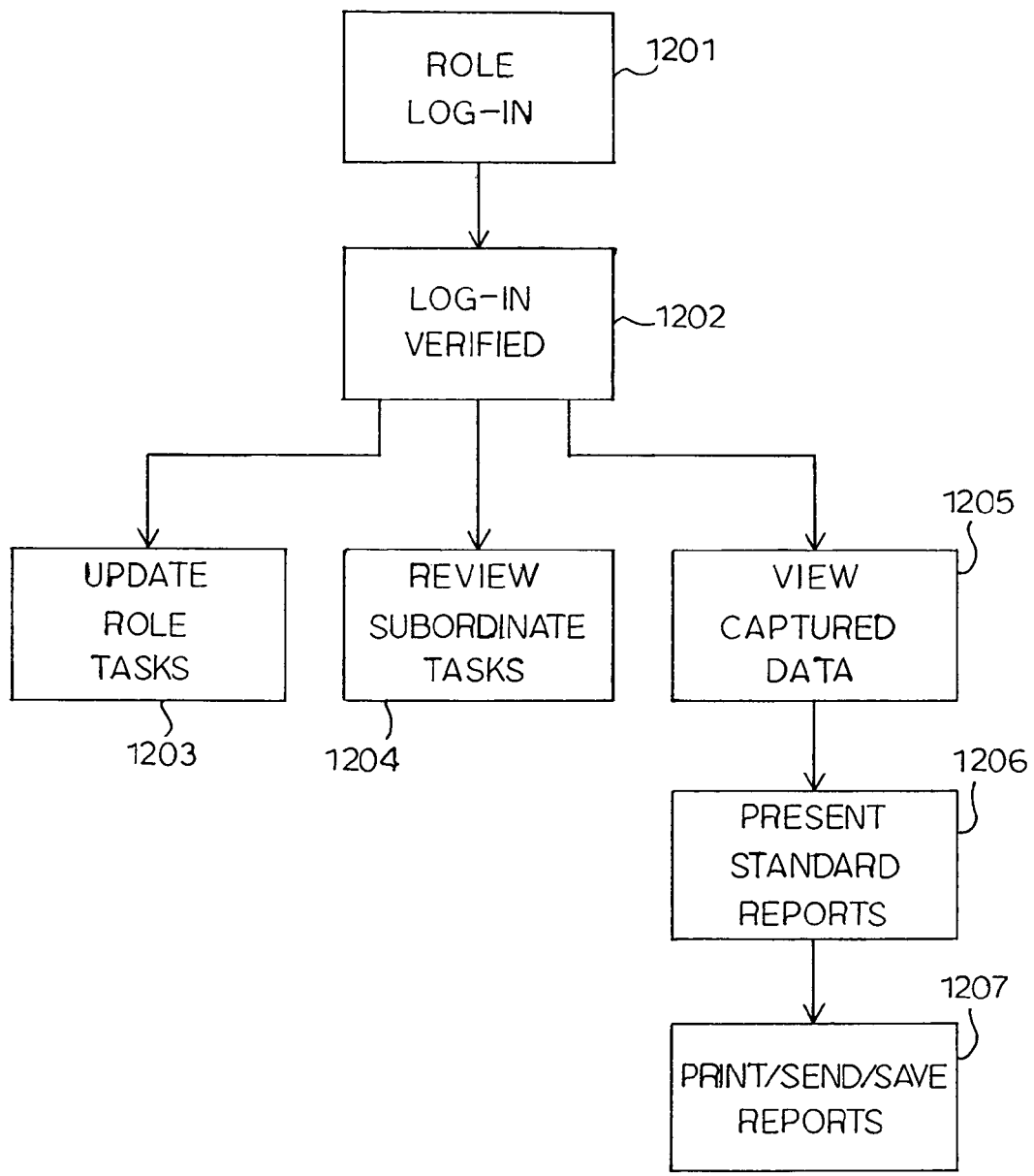
FIG. 12 is a flowchart illustrating the reporting/reviewing function of the invention.

FIG. 10 illustrates the process associated with the task management system as implemented by the work station/role. A role logs in at a work station 1001. The system recognizes that the work station is now active and based on the work station identification and/or the log-in information the system can identify the work station/role as being of a specific class for receiving particular types of activities or it can simply register that the work station/role is active 1002. The system, based on the task management module, identifies one or more tasks to be handled by the work station/role during the defined work period 1003. An example of a screen shot showing a list of tasks as it would be opened by the role is shown in FIG. 12. The system also provides the task module with the task script that must be completed by role (as previously described with reference to FIG. 5) and a report form to be returned to the system upon completion of the tasks 1004. In one embodiment the script is provided by an electronic link that opens when the role selects on the Task Name 1101 shown in FIG. 11.

The role opens the next task 1005 from the system and is presented with any information relevant to that activity including a matter identification, status and the like as previously described with reference to FIG. 5. Associated with the task is the script that must be followed by the role in order to complete the task including the questionnaire and any background information and instructions. The role proceeds through the task steps and collects responses to questionnaires or otherwise gathers data and provides the responses as prompted by the scripts 1006. Once the task is completed it is closed and the results including the collected data, analysis or other response is sent to the system data base 1007. The response from the role includes a message informing the system administrator that the task has been acted upon, the results have been reported and the task closed. The role then turns to the next task 1005 and continues in this manner until all tasks are completed.

In response to this message the system administrator updates the task management module 136 by, for example, removing the task from the priority list as described with reference to block 801 in FIG. 8. Moreover, completion of a task can trigger the addition of another task to the priority list.

Typically, a large enterprise would be asked to evaluate its overall business model and complete tasks at a level where there is commonality of processes, oversight, monitoring and control structure. Thus, an enterprise may desire to perform tasks along business units or regional lines. The invention is designed to be sufficiently flexible to handle tasks at whatever level a business unit or the enterprise desires. The hardware systems shown in FIGS. 1 and 2 can be split logically into multiple systems where multiple system administrators using the same physical systems have responsibilities segregated by region, subject matter or the like. Typically, executives, administrators, or other senior managers will receive a summary of information obtained from the tasks and will be able to drill down to whatever level of detail they want.

Note that the common database is shown at 118. This database is continually accessed and updated throughout an assessment. It is schematically shown as being accessed during the collection of information, the completion of the assessment and the approval process. However, it may also be accessed at any other step. Additional access indications are not shown for clarity.

Once the responses are captured in data base 118 the data can be retrieved by the enterprise to review either the substance of the tasks and responses or to monitor the activity of the roles and the performance of the system itself. For example, the data might be used to determine the average number of tasks performed per work period to be used when setting up future task lists. Referring to FIG. 12, at step 1201, a role initially logs in. Typically, for the data review/retrieval process the role will be functioning in a management function to review the previously completed tasks and update or revise the task management module. The role's access to the system is verified, typically by a role ID and password scheme 1202.

From this point, the role can initiate a number of different tasks. The role can simply update records as authorized for the tasks she or he is responsible for at step 1203, view open and closed items for subordinate roles 1204, or view a broader range of information as authorized at step 1205. At step 1205, a role wishing to utilize this portion of the module is likely located in the organization hierarchy. This reporting, for example, can be used to show an executive at any level the view of everything for those who report to that executive. In this case, standard reports may be automatically presented at step 1206. Some of the reports might include, for example, the performance metrics for the roles reporting to that executive. An executive might look at the results of a particular matter to determine how his or her area of responsibility is behaving. Reports can be printed or otherwise captured at step 1207

In at least one embodiment, the system of the invention takes place via the World Wide Web and is computer-based. Further details of the computer system implementation will be discussed with respect to FIG. 2 that illustrates a larger network infrastructure that can be used to implement example embodiments of the invention, for example, in a large corporate enterprise having a world-wide-web (WWW) enabled corporate intranet, 200. Browser clients 202 access the system via a client computing platform. A lightweight directory access protocol (LDAP) server 204 provides authentication when a role logs onto the ICPS. A commercial software product such as SiteMinder( from Netegrity, Inc., can be used for this purpose. Simple mail transfer protocol (SMTP) server 206 is used to generate outgoing notification E-mail messages at key stages of each process. A corporate directory server, 208, provides access to the company's master directory of employees (associates) and other information necessary when identifying or selecting roles for the task management system of the invention. An internet protocol (IP) switch, 210, provides load-balancing to direct sessions to one of two application servers, 212 and 214. The switch will be run under the so-called "sticky on=yes" configuration, which assures that once a session is assigned to a portal application server computing platform, the session will continue to work in/from that portal until the session is completed.

In this example embodiment, the application servers run using Microsoft's Internet Information Services (IIS). These servers are the launch point for the system modules and will direct action back and forth among the other servers and databases. The common database which has been previously discussed, is implemented on an SQL server shown at 209. The network of FIG. 2 also includes an IIS-based reporting server, 220, which handles report formats and similar tasks involved with operating the reporting module. The reporting server has a stub on the application server that serves as an interface. The reporting server has the ability to schedule reports, such that the data is accessed during off hours during otherwise low utilization of the SQL server. The reporting server accumulates those reports in batch rather than real time.

The login procedure is as follows. A login request is directed through the IP switch to one of the portal application servers. The app server directs the request to the LDAP server for authentication and the LDAP server authenticates and forwards the request to the SQL database for authentication, confirming that the role is known to the task management system. Confirmation and information about the role is forwarded back to the app server at.

Next, a query is forwarded to the corporate directory, where information about the role is obtained, as well as information about business units for which the role is handling any tasks. The type of employee information will be name, telephone number and possibly postal and Email addresses. For business units the information may be the business unit name, executive associated with that business unit, and hierarchy information. The information is included in a reply and the app server copies it to the SQL database, where the information is stored. This operation is confirmed, and a welcome screen is generated for the role. From that welcome page, the role will be presented with the tasks and task scripts for which the role is responsible. The role opens the task or script template via the task module on the app server. The role enters responses interactively and the database is continually updated at shown. The template resides on the app server and the data in the SQL database.

In this example embodiment, the invention is implemented in a web-based system. The browser "skin" (forward and back buttons, scroll bars, etc.) is not shown for clarity.

Specific embodiments of an invention are described herein. One of ordinary skill in the computing and networking arts will quickly recognize that the invention has other applications in other environments. In fact, many embodiments and implementations are possible. The following claims are in no way intended to limit the scope of the invention to the specific embodiments described above.

What is claimed is:

1. A task management system for an organization that includes a plurality of business units comprising:
    a memory system;
    a processing system operatively coupled to the memory system and configured to execute one or more modules stored therein;
    a set of rules stored in the memory system comprising at least one rule governing operation of the organization wherein the at least one rule further comprises legal or regulatory requirements or policies established by an entity other than the organization;
    a task module stored in the memory system and configured to define a plurality of tasks associated with a plurality of different business units to be completed, wherein said plurality of tasks is directed to compliance with the at least one rule and is stored in the memory system after the set of rules is stored in the memory system and wherein said at least on task is linked to the at least one rule in the memory system;
    a task management module stored in the memory system and configured to control completion of the plurality of tasks defined by the task module, wherein the task management module:
        groups each of the tasks with one of a plurality of matters;
        assigns priorities to each of the plurality of matters such that tasks grouped with a matter having a higher priority themselves have a higher priority than tasks grouped with a matter having a lower priority;
        assigns a risk rating to each of the plurality of tasks including assigning a weighted average risk rating to at least one of the plurality of tasks and assigning a simplified risk rating to at least one of the plurality of tasks; and
        prioritizes each of the plurality of tasks grouped with each of the matters using a combination of the assigned weighted average risk ratings and the assigned simplified risk ratings such that tasks with higher risk ratings are given a higher priority than other tasks grouped with the same matter; and
    a common database stored in the memory system and operatively connected to the task module and the task management module, wherein the task module, the task management module, and the common database are together operative to schedule completion of tasks such that each of the plurality of tasks are prioritized and completed in a consistent manner across the plurality of business units.

2. The system of claim 1 wherein the task module defines a series of steps to be completed in order to complete the task.

3. The system of claim 2 wherein a response is provided and stored in the common database.

4. The system of claim 3 wherein the response can be retrieved and reviewed from the common database.

5. A method of managing tasks for an organization that includes a plurality of business units, the method comprising the steps of:
   accessing a set of rules stored in a memory system, wherein said set of rules comprises at least one rule governing operation of the organization wherein the set of rules further comprises legal or regulatory requirements or policies established by an entity other than the organization;
   creating a plurality of tasks to be completed, the plurality of tasks being associated with a plurality of different business units, wherein said plurality of tasks is created at least in part based on the set of rules and comprises at least one task directed to compliance with the at least one rule;
   storing said plurality of tasks in the memory system, wherein said plurality of tasks are stored in the memory system after the set of rules is stored in the memory system and wherein the at least one task is linked in the memory system to the at least one rule;
   creating steps to be completed to complete each task of the plurality of tasks;
   grouping each of the tasks with one of a plurality of matters;
   assigning priorities to each of the plurality of matters such that tasks grouped with a matter having a higher priority themselves have a higher priority than tasks grouped with a matter having a lower priority;
   assigning a risk rating to each of the plurality of tasks including assigning a weighted average risk rating to at least one of the plurality of tasks and assigning a simplified risk rating to at least one of the plurality of tasks;
   prioritizing each of the plurality of tasks grouped with each of the matters using a combination of the assigned weighted average risk ratings and the assigned simplified risk ratings such that tasks with higher risk ratings are given a higher priority than other tasks grouped with the same matter;
   assigning a prioritized list of tasks to a role for completion; and
   accessing the steps of the plurality of tasks based on priority of the tasks as indicated in the prioritized list of tasks such that each of the plurality of tasks are prioritized and completed in a consistent manner across the plurality of business units.

6. The method of claim 5 further comprising identifying rules applicable to operation of the organization.

7. The method of claim 5 wherein the step of prioritizing further includes the step of identifying a determined number of tasks to be completed in a defined work period.

8. The method of claim 5 further including the step of providing response to complete the steps.

9. The method of claim 8 wherein the response are stored in a database.

10. The method of claim 5 wherein the plurality of tasks are competed by more than one role.

11. The method of claim 5 wherein the plurality of tasks are completed at more than one work station.

12. The method of claim 5 wherein the steps are based on a rule.

13. The method of claim 5 further comprising the step of accessing the response after completion of the task.

14. The method of claim 5 further comprising the step of providing a report based on the response.

15. The method of claim 14 further comprising the step of providing the report automatically.

16. A computer program product comprising a non-transitory computer-readable storage medium comprising a computer program stored therein for facilitating task management for an organization that includes a plurality of business units, the computer program further comprising:
   instructions for accessing a set of rules stored in a memory system, wherein said set of rules comprises at least one rule governing operation of the organization wherein the set of rules further comprises legal or regulatory requirements or policies established by an entity other than the organization;
   instructions for creating a plurality of tasks to be completed, the plurality of tasks being associated with a plurality of different business units, wherein said plurality of tasks is created at least in part based on the set of rules and comprises at least one task directed to compliance with the at least one rule;
   instructions for storing said plurality of tasks in the memory system, wherein said plurality of tasks are stored in the memory system after the set of rules is stored in the memory system and wherein the at least one task is linked in the memory system to the at least one rule;
   instructions for creating a series of steps to be completed to complete each task of the plurality of tasks;
   instructions for grouping each of the tasks with one of a plurality of matters;
   instructions for assigning priorities to each of the plurality of matters such that tasks grouped with a matter having a higher priority themselves have a higher priority than tasks grouped with a matter having a lower priority;
   instructions for assigning a risk rating to each of the plurality of tasks including assigning a weighted average risk rating to at least one of the plurality of tasks and assigning a simplified risk rating to at least one of the plurality of tasks;
   instructions for prioritizing each of the plurality of tasks grouped with each of the matters using a combination of the assigned weighted average risk ratings and the assigned simplified risk ratings such that tasks with higher risk ratings are given a higher priority than other tasks grouped with the same matter;
   instructions for assigning a prioritized list of tasks to a role for completion;
   instructions for accessing the series of steps based on the prioritized list of tasks to access the series of steps such that each of the plurality of tasks are prioritized and completed in a consistent manner across the plurality of business units; and
   instructions for collecting responses to at least some of said series of steps.

17. A system comprising:
   a set of rules stored in a memory system, wherein said set of rules govern operation of an organization that comprises a plurality of business units, wherein the set of rules comprise legal or regulatory requirements or policies established by an entity other than the organization;

a computing platform comprising at least one application module for facilitating task management, wherein the at least one application module comprises at least a task management module, the task management module operable to:

group each of the tasks with one of a plurality of matters;

assign priorities to each of the plurality of matters such that tasks grouped with a matter having a higher priority themselves have a higher priority than tasks grouped with a matter having a lower priority;

assign a risk rating to each of the plurality of tasks including assigning a weighted average risk rating to at least one of the plurality of tasks and assigning a simplified risk rating to at least one of the plurality of tasks;

produce a prioritized list of tasks to be completed, the list of tasks being associated with a plurality of different business units, wherein each task is directed to compliance with at least one rule in the set of rules, and wherein each task is linked to the at least one rule in the memory system, wherein the task management module prioritizes each of the plurality of tasks grouped with each of the matters using a combination of the assigned weighted average risk ratings and the assigned simplified risk ratings such that tasks with higher risk ratings are given a higher priority than other tasks grouped with the same matter;

a task module defining steps to be completed to complete each task, wherein said steps are generated at least in part based on the set of rules after the set of rules is stored in the memory system; and a common database operatively connected to the task management module and the task module, wherein the database is configured to store and retrieve data produced by the task module in response to completion of the list of tasks produced by the task management module such that each of the plurality of tasks are prioritized and completed in a consistent manner across the plurality of business units.

18. The system of claim 17 wherein the database is disposed within the computing platform.

19. The system of claim 17 wherein the database is disposed within a server which is operatively connected to the at least one application module through a network.

20. The system of claim 17 wherein the at least one application module is accessed by a role via a web page.

21. The system of claim 17 further comprising an Email server for sending Email notifications related to the task.

22. The system of claim 17 wherein the task module further comprises a plurality of instructions for completing the tasks.

* * * * *